United States Patent [19]
Miller

[11] Patent Number: 6,032,381
[45] Date of Patent: Mar. 7, 2000

[54] DOVETAIL ACCESSORY FOR A DIAL TEST INDICATOR

[76] Inventor: Walter R Miller, 37 Dunlop Rd., Huntington, N.Y. 11743

[21] Appl. No.: 08/759,064

[22] Filed: Dec. 2, 1996

[51] Int. Cl.[7] .............................. F16C 11/00; G01B 3/22
[52] U.S. Cl. ................ 33/832; 248/222.14; 248/224.51; 248/291.1; 33/556; 403/84
[58] Field of Search ............................ 33/832, 833, 834, 33/545, 546, 549, 551, 553, 556, 559; 403/84, 87, 103, 381, 362; 248/291.1, 224.51, 222.14

[56] References Cited

U.S. PATENT DOCUMENTS

| | | | |
|---|---|---|---|
| 2,456,003 | 12/1948 | Knutson | 33/543 |
| 2,472,431 | 6/1949 | Marcil | 33/556 |
| 2,506,924 | 5/1950 | Huber | 33/572 |
| 3,442,478 | 5/1969 | Parapetti | 248/284.1 |
| 3,857,643 | 12/1974 | Bardocz | 403/63 |
| 4,203,227 | 5/1980 | Giroux | 33/458 |
| 4,313,263 | 2/1982 | McMurry | 33/572 |
| 4,823,473 | 4/1989 | McMahon | 33/787 |
| 5,185,936 | 2/1993 | McMurtry | 33/572 |
| 5,335,424 | 8/1994 | Spangler | 33/834 |
| 5,402,584 | 4/1995 | Kessler | 33/783 |
| 5,456,017 | 10/1995 | Meier | 33/572 |
| 5,551,795 | 9/1996 | Engibarov | 403/381 |

*Primary Examiner*—Andrew Hirshfeld
*Assistant Examiner*—Richard H. Smith
*Attorney, Agent, or Firm*—Michael I. Kroll

[57] ABSTRACT

A dovetail accessory (16) for a dial test indicator (18) having a body (20) with a dovetail tongue (22). The accessory (16) comprises a dovetail hinge member (24) to attach in an adjustable manner the dial test indicator (18) to a dovetail extension (26) in a spindle (28) of a piece of industrial machinery (30), so that the dial test indicator (18) can be properly aligned and positioned to measure various objects on the piece of industrial machinery (30). Other dovetail accessories are also provided, such as a modified dovetail hinge member (46), a dovetail adapter (72), a dovetail track bar (88), a horizontal adjustment attachment (100) and a ninety degree angle bracket (104).

1 Claim, 12 Drawing Sheets

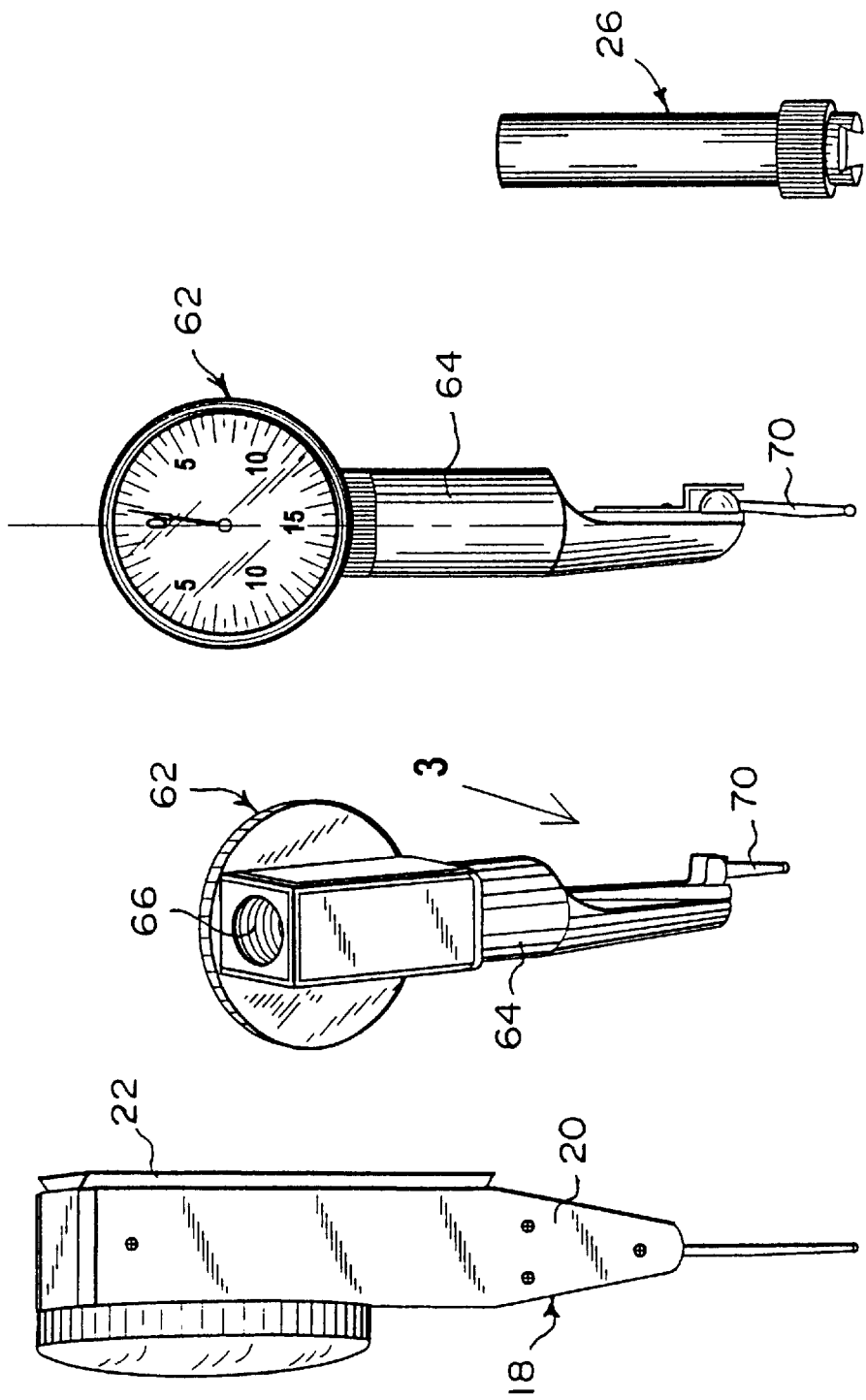

DOVETAIL ACCESSORY FOR A DIAL TEST INDICATOR

DESCRIPTION OF THE PRIOR ART

Numerous measuring machines mounting devices have been provided in prior art. For example, U.S. Pat. No. 2,456,003 to Knutson; U.S. Pat. No. 2,506,924 to Huber; U.S. Pat. No. 3,442,478 to Parapetti, U.S. Pat. No. 4,313,263 to McMurtry; U.S. Pat. No. 5,185,936 to McMurtry; U.S. Pat. No. 5,335,424 to Spangler and U.S. Pat. No. 5,456,017 to Meier all are illustrative of such prior art. While these units may be suitable for the particular purpose to which they address, they would not be as suitable for the purposes of the present invention as heretofore described.

KNUTSON, LESTER T.

UNIVERSAL INDICATOR SUPPORT

U.S. Pat. No. 2,456,003

In combination with an indicator having a casing and a plunger with a head thereon adapted to contact a rotating surface whereby the indicator will reveal irregularities of said surface, a plate member, means rigidly connected with the plate member for supporting both the plate member and the indicator, and means for rotatably mounting the indicator on a lateral surface of the plate member.

HUBER, PAUL J.

FINE ADJUSTMENT DEVICE FOR DIAL INDICATORS

U.S. Pat. No. 2,506,924

A test indicator gauge including in combination, a supporting arm terminating in a pivotal ear. A dial indicator has a pivotal ear extended therefrom. A substantially straight elongated intermediate member has a slot at one end and a recess at the other.

PARAPETTI, NICOLAS

UNIVERSALLY ADJUSTABLE DIAL INDICATOR HOLDER

U.S. Pat. No. 3,442,478

This universally adjustable dial indicator holder comprises a C-clamp easily applicable from either side to a spindle on a vertical milling, boring, or grinding machine without disturbing the tooling on the spindle at given setting thereof. The clamp carries on one side thereof a first swivel bolt joint with respect to which a rod is extensibly or rotatably adjustably clamped. The rod has swivelled on its outer end a second swivel bolt on which one end of a link is swivelled. The link carries on its other end a third swivel bolt adjustably supporting a dial indicator. The latter mounting may be of a form utilizing a dovetail sliding connection for endwise adjustability of the dial test indicator relative to the swivel. Each of the three swivel bolts has a manually adjustable nut thereon for tightening a spring tensioned friction joint. The articulated assembly is adapted for holding the dial indicator reliably in practically any position of adjustment.

MCMURTRY, DAVID R.

METHOD AND APPARATUS FOR USE IN CO-ORDINATE MEASURING MACHINES

U.S. Pat. No. 4,313,263

In a co-ordinate measuring machine a probe is connected to the head of the machine by a pivotal arm. The orientation of the probe is charged by moving the head so that the arm engages a fixed structure. A moment is applied to the arm which is thereby caused to turn and present the probe in the required orientation.

McMURTRY, DAVID R.

PROBE HEAD WITH INDEXING MECHANISM

U.S. Pat. No. 5,185,936

A probe head includes a support by which the probe head is retained on the quill of a coordinate positioning machine, and a rotor which is magnetically retained on the support. The rotor is rotatable between a plurality of indexed angular positions provided by a ring or balls and three adjacently positioned pair of rollers. A drive dog shaft is linearly movable to disengage the balls from the rollers, and rotatable to rotate the rotor to a new indexed position, whereupon the drive dog shaft is retracted to reengage a set of three balls with the rollers. Exchange of a measuring probe is performed by removing the entire rotor, and exchanging it for a further rotor carrying a different measuring probe. The engagement elements provided by rollers and balls thus serve the functions of indexing and repeatably retaining a rotor on the support. This reduces the number of kinematic locations required between the movable arm of the machine and the probe during the course of normal operation of a probe head to which a number of probes are releasably couplable.

SPANGLER, DAVID

GAUGE FOR MEASURING RADIAL DISTANCES ON A CYLINDRICAL SURFACE

U.S. Pat. No. 5,335,424

An apparatus for measuring radial distances relative to the surface of a cylinder includes a chassis supported on the cylinder by at least three wheels, at least one of which is rotatable about an axis different from the axes about which the remaining wheels rotate, and all of which are spaced from one another in a direction parallel to the longitudinal axis of the cylinder. A gauge is provided for measuring radial distances relative to the surface of the cylinder when the chassis is supported on the cylinder by the wheels, the gauge being supported on the chassis in such a way as to allow adjustment both of the height of the gauge relative to the chassis and of the position of the gauge relative to the chassis in a direction parallel to the axis of the cylinder.

MEIER, DANIEL

ADJUSTABLE HOLDER FOR THE FINE ADJUSTMENT OF A DIAL GAUGE

U.S. Pat. No. 5,456,017

A dial gauge adaptor having a single shaped part forming two elastically connected legs. One leg is longer than the other one and overlaps it at its end. The tip of the longer leg is designed to receive a dial gauge, while the adaptor itself can be attached to a stand by its other end, at the base of the two legs. An adjustment rocker acting as a toggle lever is located between the two legs of the adaptor. The rocker is displaced at its longer lever end by a ball beating forming the end of a fine adjustment screw.

SUMMARY OF THE INVENTION

A primary object of the present invention is to provide a dovetail accessory for a dial test indicator that will overcome the shortcomings of the prior art devices.

Another object is to provide a dovetail accessory for a dial test indicator that will be a better attachment for the alignment and positioning of the dial test indicator in lath tool posts, milling machine arbors, vernier height gauges and CNC machines, but not limited to only these machines.

An additional object is to provide a dovetail accessory for a dial test indicator that will utilize a dovetail tongue and groove joint for attaching the accessory to the dial test indicator, to enhance the function of the dial test indicator.

A further object is to provide a dovetail accessory for a dial test indicator that is simple and easy to use.

A still further object is to provide a dovetail accessory for a dial test indicator that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is prior art being a side perspective view of a dovetail dial test indicator.

FIG. 2 is prior art being a rear perspective view of an end plug dial test indicator.

FIG. 3 is prior art being a front elevational view taken in the direction of arrow 3 in FIG. 2, showing the feeler contact off center.

FIG. 4 is prior art being a perspective view of a dovetail extension.

Similar reference characters denote corresponding features consistently throughout the attached drawings.

DETAILED DESCRIPTION OF THE PREFERRED EMBODIMENTS

Figure 9:
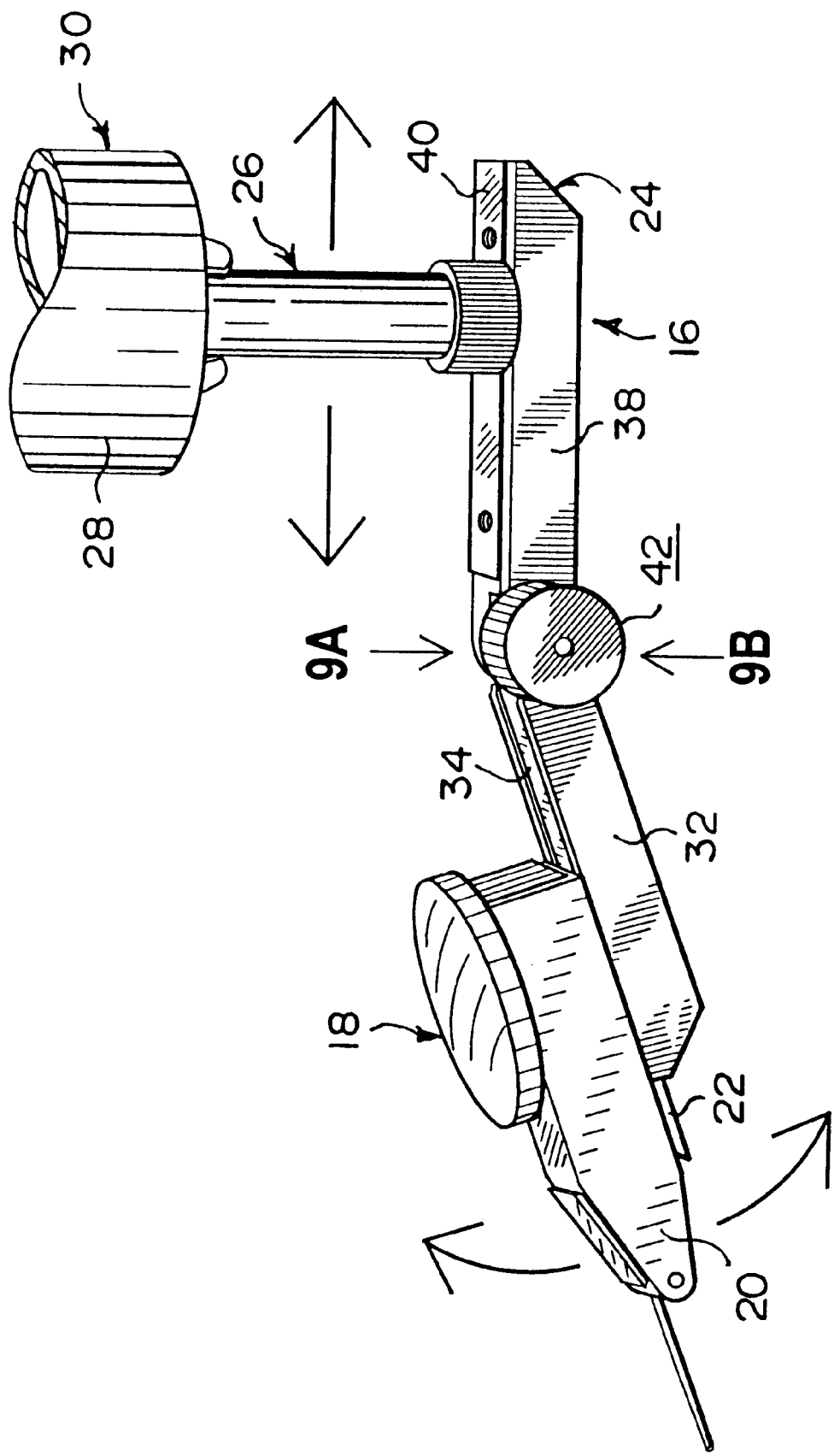
FIG. 9 is a perspective view of a first embodiment of the instant invention being a dovetail hinge member in use.
Figure 9A:
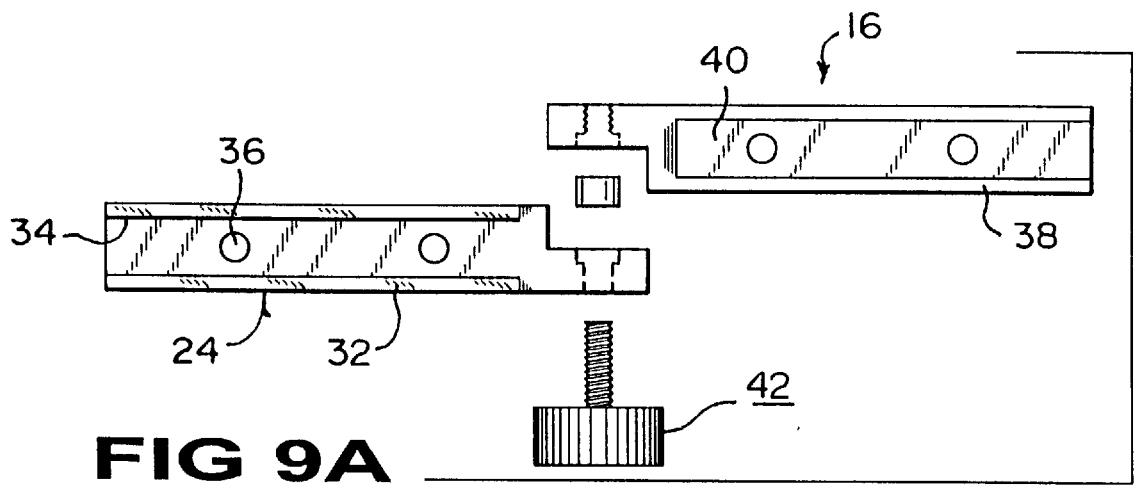
FIG. 9A is an exploded top view of the first embodiment per se taken in the direction of arrow 9A in FIG. 9.
Figure 9B:
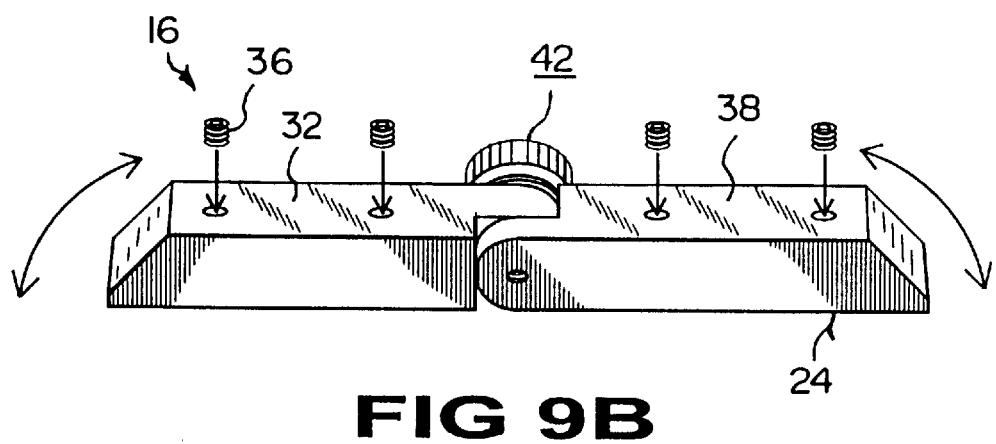
FIG. 9B is a bottom perspective view of the first embodiment per se taken in the direction of arrow 9B in FIG. 9.

Turning now descriptively to the drawings, in which similar reference characters denote similar elements throughout the several views, FIGS. 9, 9A and 9B illustrate a first dovetail accessory 16, being prior art in FIG. 1, for a dial test indicator 18 having a body 20 with a dovetail tongue 22. The accessory 16 comprises a dovetail hinge member 24 to attach in an adjustable manner the dial test indicator 18 to a dovetail extension 26, being prior art in FIG. 4, in a spindle 28 of a piece of industrial machinery 30, so that the dial test indicator 18 can be properly aligned and positioned to measure various objects on the piece of industrial machinery 30.

The dovetail hinge member 24 includes a first arm 32 having a top dovetail groove 34, to engage with the dovetail tongue 22 on the body 20 of the dial test indicator 18. A setscrew 36 is in the first arm 32, to retain in place the dovetail tongue 22 on the body 20 of the dial test indicator 18 within the top dovetail groove 34. A second arm 38 has a top dovetail tongue 40 to engage with the dovetail extension 26. A locking pivot assembly 42 is between the first arm 32 and the second arm 38.

Figure 10:
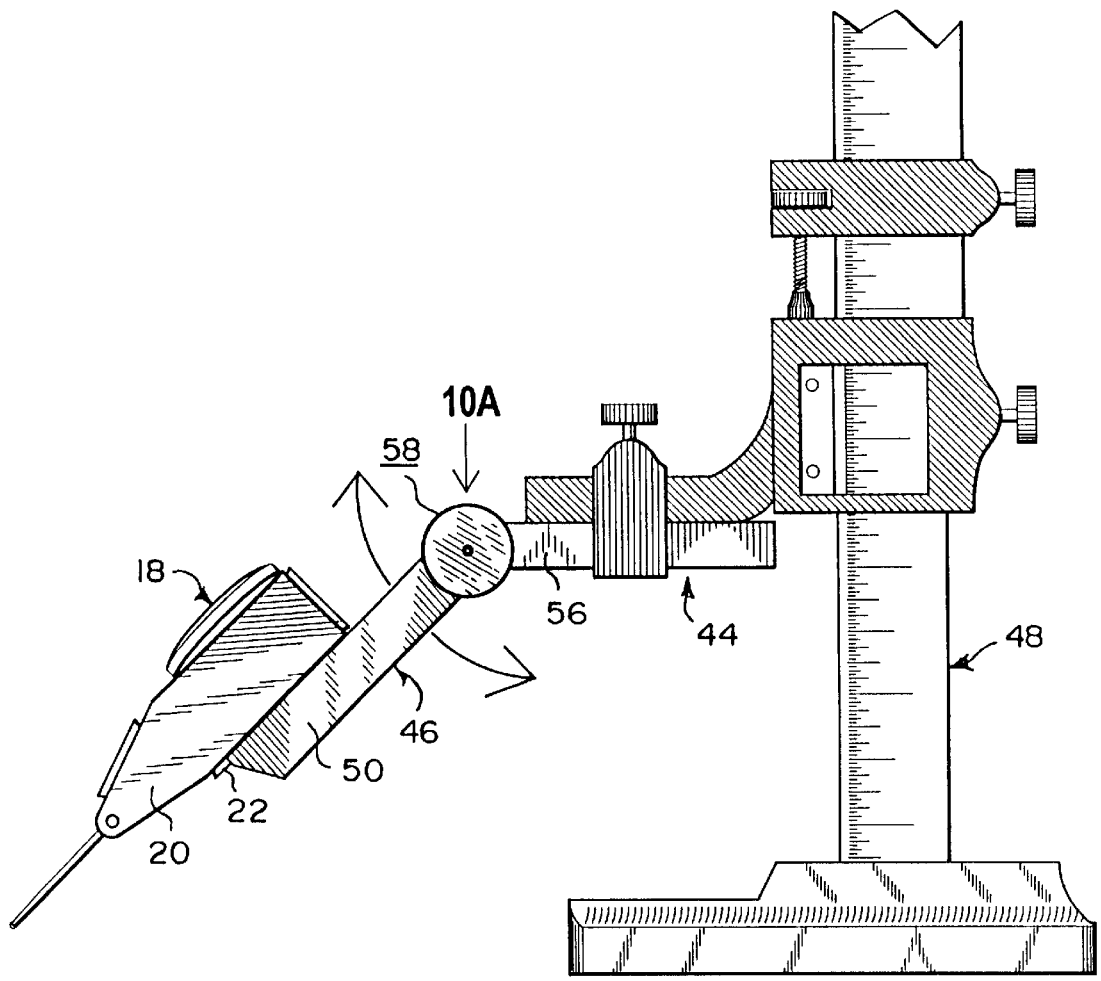
FIG. 10 is a side view of a second embodiment of the instant invention being a modified dovetail hinge member in use.
Figure 10A:
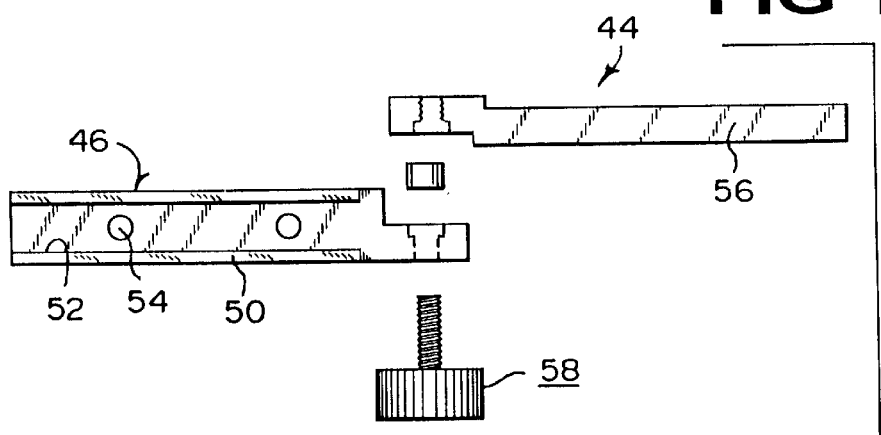
FIG. 10A is an exploded top view of the second embodiment per se taken in the direction of arrow 10A in FIG. 10.

FIGS. 10 and 10A show a second dovetail accessory 44 for the dial test indicator 18, having the body 20 with the dovetail tongue 22. The accessory 44 comprises a modified dovetail hinge member 46 to attach in an adjustable manner the dial test indicator 18 to a vernier height gauge 48 on a flat surface, so that the dial test indicator 18 can be properly aligned and positioned to measure various objects placed upon the flat surface.

The modified dovetail hinge member 46 includes a first arm 50 having a top dovetail groove 52 to engage with the dovetail tongue 22 on the body 20 of the dial test indicator 18. A setscrew 54 is in the first arm 50 to retain in place the dovetail tongue 22 on the body 20 of the dial test indicator 18 within the top dovetail groove 52. A second arm 56 being a rectangular bar engages with the vernier height gauge 48. A locking pivot assembly 58 is between the first arm 50 and the second arm 56.

Figure 11:
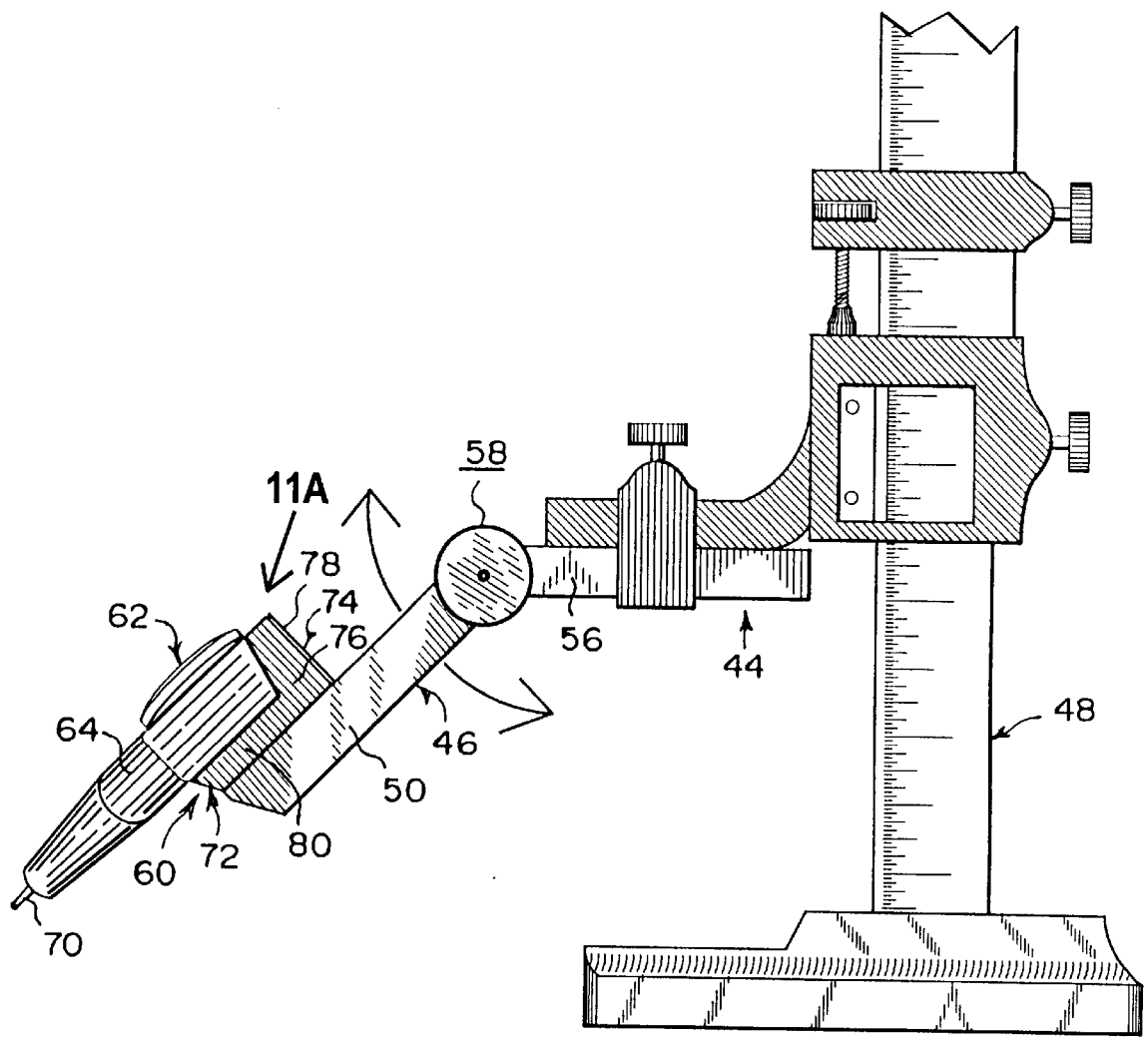
FIG. 11 is a side view of a third embodiment of the instant invention being a dovetail adapter in use.
Figure 11A:
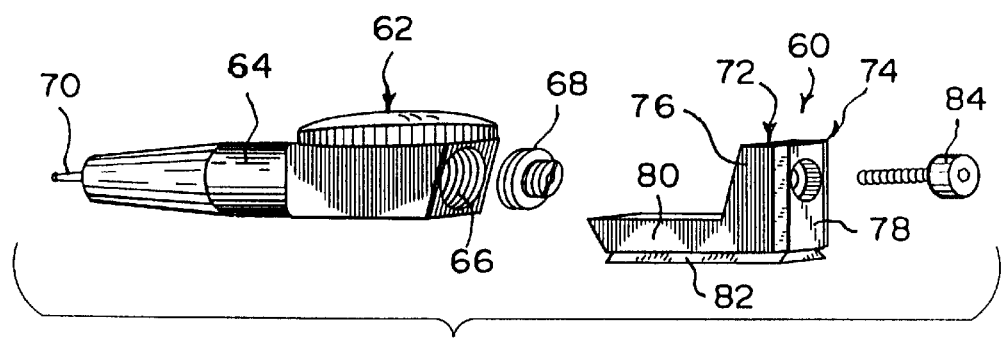
FIG. 11A is an exploded perspective view of the third embodiment from the end plug dial test indicator, taken in the direction of arrow 11A in FIG. 11.

FIGS. 11 and 11A show a third dovetail accessory 60 for a dial test indicator 62, being prior art in FIGS. 2 and 3, having a body 64 with a threaded end plug aperture 66, a threaded end plug 68 and an offset ball feeler contact 70. The accessory 60 comprises a dovetail adapter 72 to attach to the dial test indicator 62 via the threaded end plug 68, so that the dial test indicator 62 can be converted into a dovetail dial test indicator.

The dovetail adapter 72 includes a generally L-shaped housing 74, having a short leg 76 with a first dovetail tongue 78 and a long leg 80 with a second dovetail tongue 82. A mounting screw 84 extends through the first dovetail tongue 78 in the short leg 76 and into the threaded end plug 68, so as to hold the housing 74 against the body 64 of the dial test indicator 62.

Figure 12:
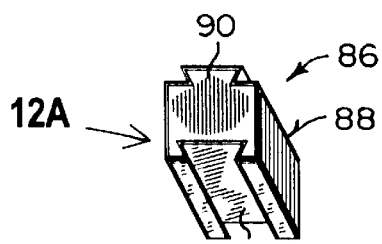
FIG. 12 is an end perspective view of a fourth embodiment of the instant invention being a dovetail track bar.
Figure 12D:
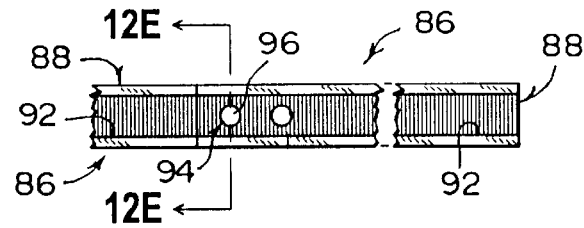
FIG. 12D is a bottom view of the fourth embodiment taken in the direction of arrow 12D in FIG. 12C, being in engagement with another dovetail track bar.
Figure 12A:
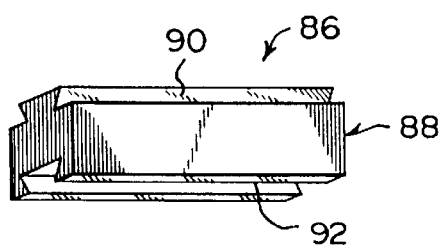
FIG. 12A is a side perspective view of the fourth embodiment taken in the direction of arrow 12A in FIG. 12 having a short length.
Figure 12E:
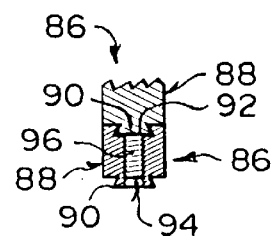
FIG. 12E is a cross sectional view of the fourth embodiment taken along line 12E—12E in FIG. 12D.
Figure 12B:
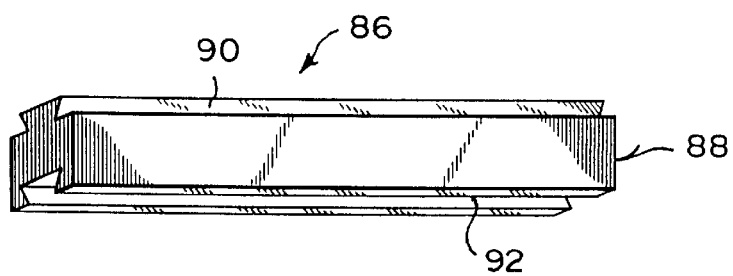
FIG. 12B is a side perspective view of the fourth embodiment having a medium length.
Figure 12C:
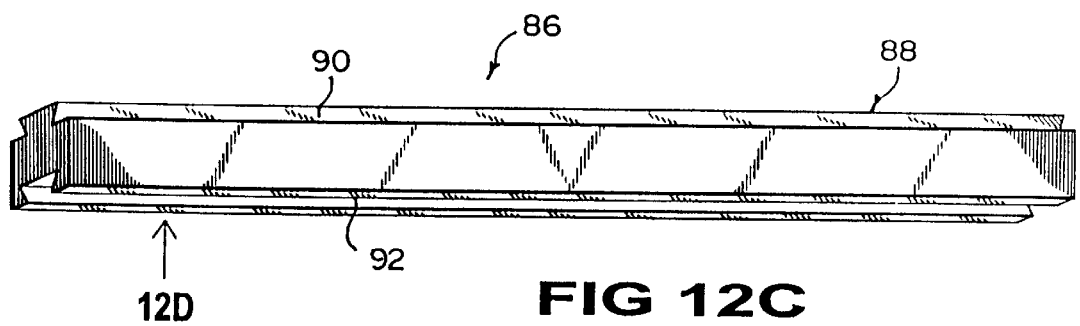
FIG. 12C is a side perspective view of the fourth embodiment having a long length.

FIGS. 12 to 12E show a fourth dovetail accessory 86 for a dial test indicator 18 or 62, comprising a dovetail track bar 88 having a dovetail tongue 90 and dovetail groove 92 oppositely positioned to one another. A component 94 is at one end of the dovetail track bar 88, for securing the dial test indicator 18 or 62, another dovetail track bar 88 and other dovetail components thereto. The securing component 94 is a setscrew 96 recessed transversely in the dovetail track bar 88 through the dovetail tongue 90 to the dovetail groove 92.

Figure 13:
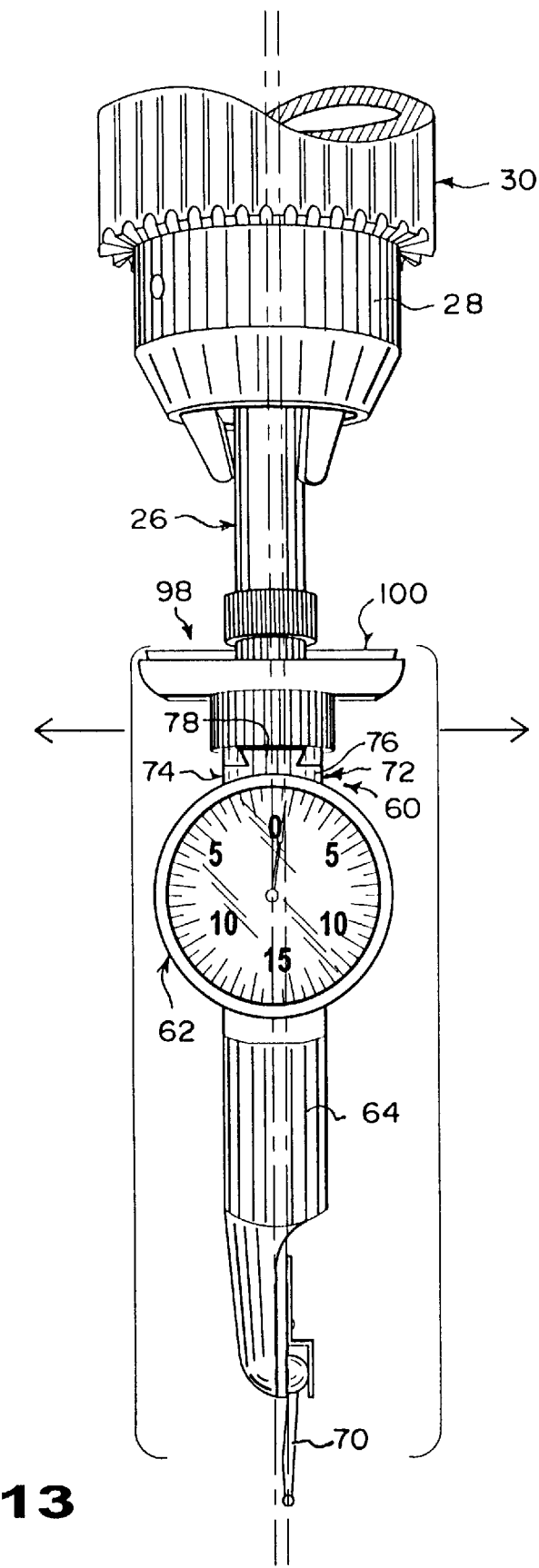
FIG. 13 is a front perspective view showing a fifth embodiment of the instant invention, being a horizontal adjustment attachment in use.
Figure 13A:
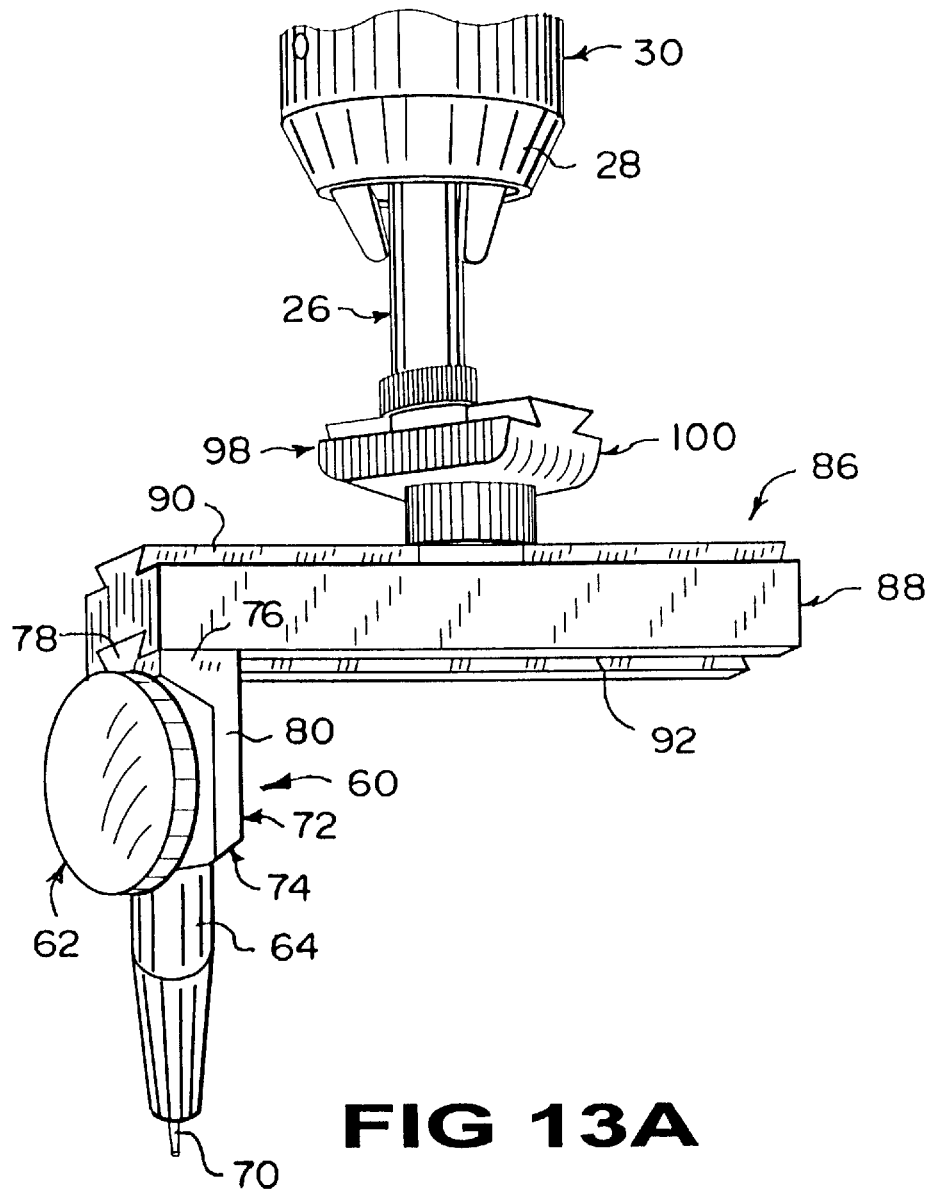
FIG. 13A is a side perspective view showing the fifth embodiment in another use.
Figure 13B:
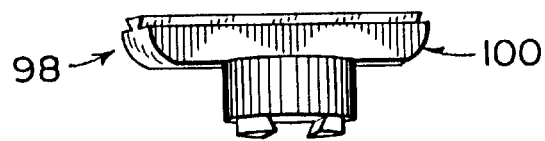
FIG. 13B is a front perspective view of the fifth embodiment per se.

FIGS. 13 and 13B show a fifth dovetail accessory 98, comprising a horizontal adjustment attachment 100 to attach in an adjustable manner the dovetail adapter 72 on the dial test indicator 62 to the dovetail extension 26 in the spindle 28 of the piece of industrial machinery 30. The offset ball feeler contact 70 can be properly aligned and positioned to measure various objects on the piece of industrial machinery 30.

In FIG. 13A, the horizontal adjustment attachment 100 will attach to the dovetail extension 26 in the spindle 28 of the piece of industrial machinery 30. The dovetail tongue 90 of the dovetail track bar 88 is attached in an adjustable manner to the horizontal adjustment attachment 100. A dial test indicator 18 or 62 is attached to an opposite end of the dovetail track bar 88. The offset ball feeler contact 70 can be properly aligned and positioned to measure various objects on the piece of industrial machinery 30.

Figure 13C:
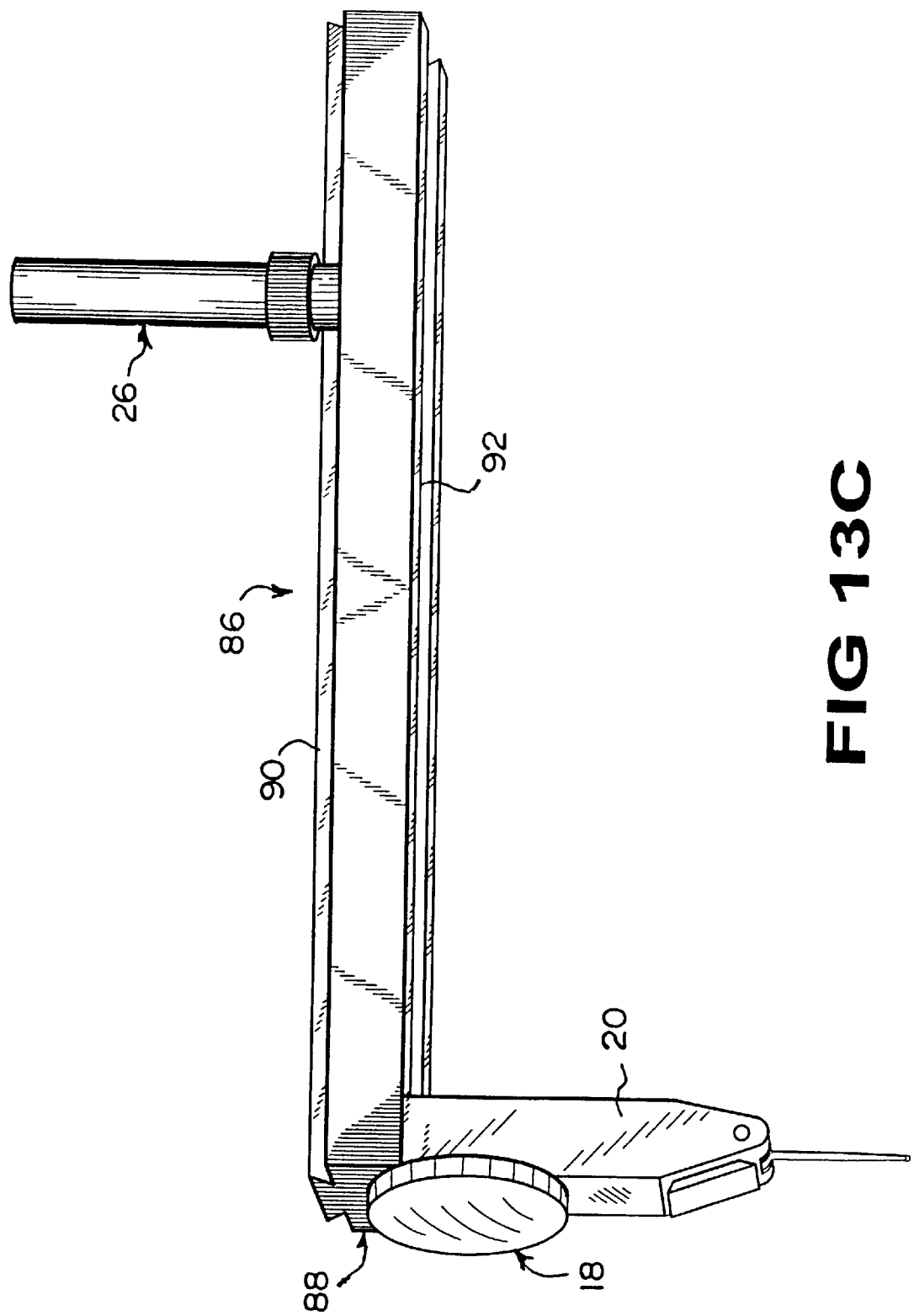
FIG. 13C is a side perspective view showing the fourth embodiment in use.

FIG. 13C shows the fourth dovetail accessory 86 being the dovetail track bar 88, having the dovetail tongue 90 and the dovetail groove 92 oppositely positioned to one another. The dovetail extension 26 is attached to one end of the dovetail tongue 90 and is capable of sliding on the dovetail tongue 90. The other end of the dovetail track bar 88 is attached to the dial test indicator 18 or 62 by two setscrews (not shown), so as to allow for an adjustable dovetail attachment.

Figure 14:
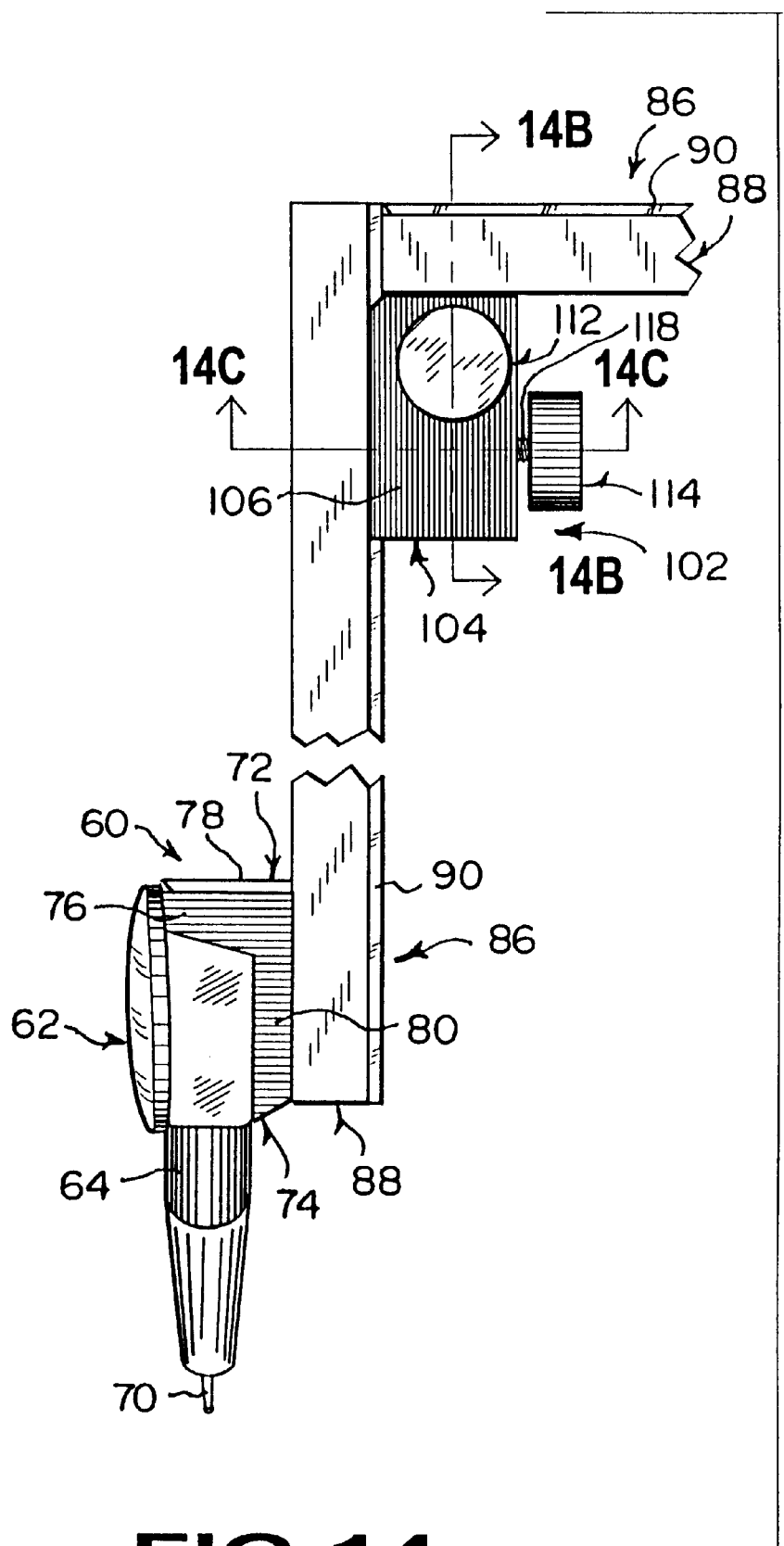
FIG. 14 is a side view of a sixth embodiment of the instant invention, being a ninety degree angle bracket in use.
Figure 14A:
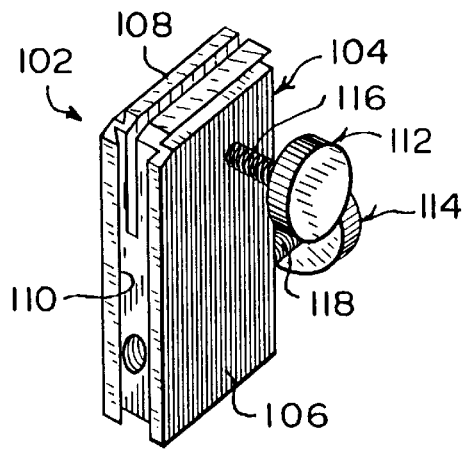
FIG. 14A is a perspective view of the sixth embodiment.
Figure 14C:
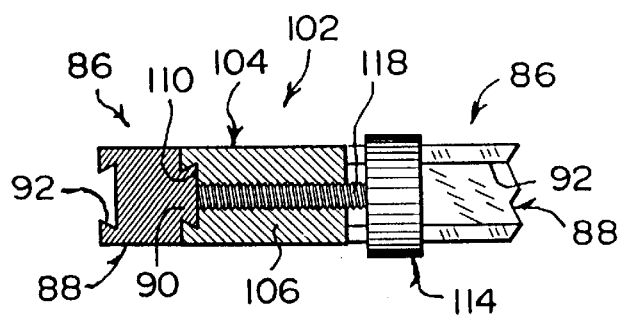
FIG. 14C is a cross sectional view of the sixth embodiment taken along line 14C—14C in FIG. 14.
Figure 14B:
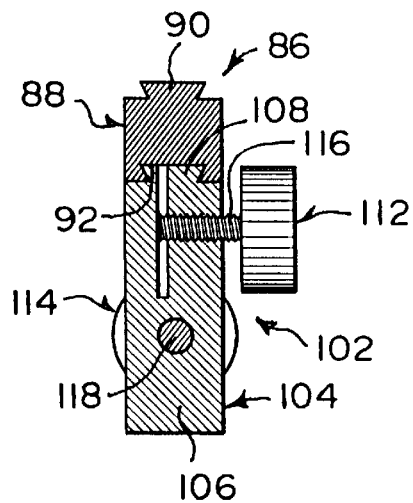
FIG. 14B is a cross sectional view of the sixth embodiment taken along line 14B—14B in FIG. 14.

FIGS. 14 to 14C show a sixth dovetail accessory 102 comprising a ninety degree angle bracket 104, having a rectangular body 106 with a longitudinal slotted dovetail tongue 108 on one end and a dovetail groove 110 on one side. Two thumbscrews 112, 114 are provided, which crisscross through the rectangular body 106. A threaded shank 116 of the first thumbscrew 112 contacts the longitudinal slotted dovetail tongue 108, while a threaded shank 118 of the second thumbscrew 114 contacts the dovetail groove 110. When the dovetail groove 92 of a first dovetail track bar 88 is retained on the longitudinal slotted dovetail tongue 108, and the dovetail tongue 90 of a second dovetail track 88 is retained on the dovetail groove 110 in the rectangular body 106, a true ninety degree support is provided for mounting the dial test indicator 18 or 62 on a vertical axis on the second dovetail track bar 88.

Figure 8:
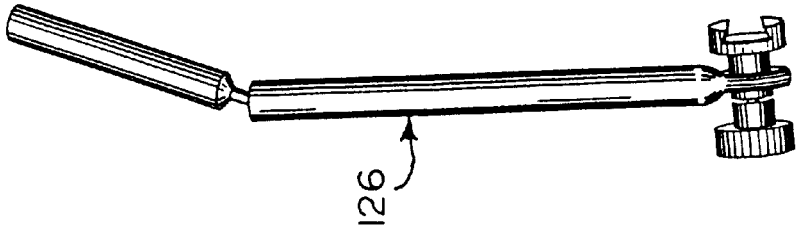
FIG. 8 is prior art being a perspective view of a single jointed dovetail holder that can be used with the dovetail dial test indicator in FIG. 1.
Figure 7:
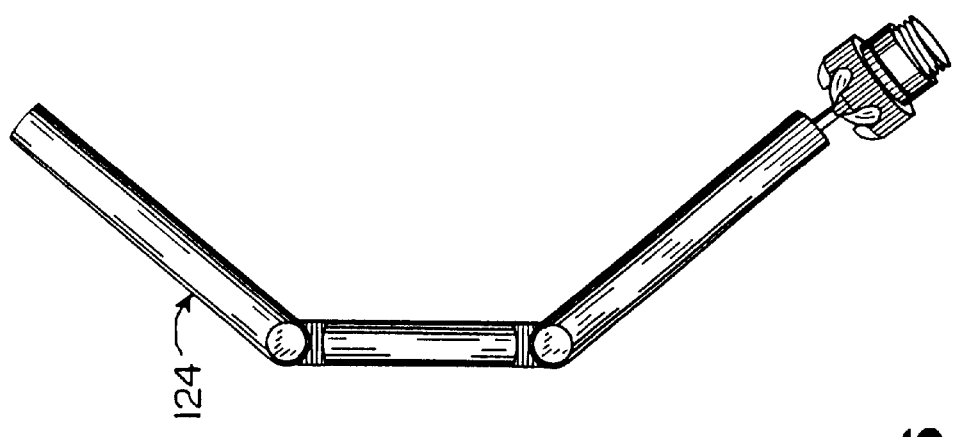
FIG. 7 is prior art being a perspective view of a double jointed end plug holder that can be used with the end plug dial test indicator in FIGS. 2 and 3.
Figure 6:
FIG. 6 is prior art being a perspective view of an end plug universal swivel friction holder that can be used with the end plug dial test indicator in FIGS. 2 and 3.
Figure 5:
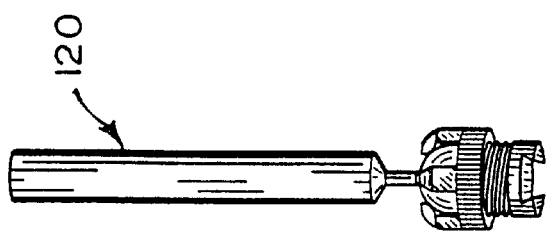
FIG. 5 is prior art being a perspective view of a dovetail universal swivel friction holder that can be used with the dovetail dial test indicator in FIG. 1.

Different prior art holders are shown in FIGS. 5 through 8. FIG. 5 is a dovetail universal swivel friction holder 120 that can be used with the dovetail dial test indicator 18 in FIG. 1. FIG. 6 is an end plug universal swivel friction holder 122 that can be used with the end plug dial test indicator 62 in FIGS. 2 and 3. FIG. 7 is a double jointed end plug holder 124, that can be used with the end plug dial test indicator 62 in FIGS. 2 and 3. FIG. 8 is a single jointed dovetail holder 126, that can be used with the dovetail dial test indicator 18 in FIG. 1.

The holders 120 and 122 are certainly versatile, but sacrifice stability and accuracy, because there are inherent errors due to the play in these types of holders. Further flaws in the construction of the holders 120 and 122 are evident where repeated measurements are necessary, because the holders used with the dial test indicators 18 or 62 can't be locked into place requiring repetitive set up tasks during the life of the project. Further limitations are evident, in that, for extended reach both horizontally and vertically it requires a different set of holders 124 and 126 with the same limitations on stability and accuracy.

LIST OF REFERENCE NUMBERS

| | |
|---|---|
| 16 | first dovetail accessory |
| 18 | dial test indicator (prior art) |
| 20 | body of 18 |
| 22 | dovetail tongue on 20 |
| 24 | dovetail hinge member for 16 |
| 26 | dovetail extension (prior art) |
| 28 | spindle of 30 |
| 30 | piece of industrial machinery |
| 32 | first arm of 24 |
| 34 | top dovetail groove in 32 |
| 36 | setscrew in 32 |
| 38 | second arm of 24 |
| 40 | top dovetail tongue on 38 |
| 42 | locking pivot assembly of 24 |
| 44 | second dovetail accessory |
| 46 | modified dovetail hinge member for 44 |
| 48 | vernier height gauge |
| 50 | first arm of 46 |
| 52 | top dovetail groove in 50 |
| 54 | setscrew in 50 |
| 56 | second arm rectangular bar of 46 |
| 58 | locking pivot assembly of 46 |
| 60 | third dovetail accessory |
| 62 | end plug dial test indicator (prior art) |
| 64 | body of 62 |
| 66 | threaded end plug aperture in 64 |
| 68 | threaded end plug of 62 |
| 70 | offset ball feeler contact of 62 |
| 72 | dovetail adapter for 60 |
| 74 | generally L-shaped housing of 72 |
| 76 | short leg of 74 |
| 78 | first dovetail tongue on 76 |

-continued

| | |
|---|---|
| 80 | long leg of 74 |
| 82 | second dovetail tongue on 180 |
| 84 | mounting screw of 72 |
| 86 | fourth dovetail accessory |
| 88 | dovetail track bar for 86 |
| 90 | dovetail tongue on 88 |
| 92 | dovetail groove in 88 |
| 94 | securing component in 86 |
| 96 | setscrew for 94 |
| 98 | fifth dovetail accessory |
| 100 | horizontal adjustment attachment for 98 |
| 102 | sixth dovetail accessory |
| 104 | ninety degree angle bracket of 102 |
| 106 | rectangular body of 104 |
| 108 | longitudinal slotted dovetail tongue on 106 |
| 110 | dovetail groove in 106 |
| 112 | first thumbscrew of 102 |
| 114 | second thumbscrew of 102 |
| 116 | threaded shank of 112 |
| 118 | threaded shank of 114 |
| 120 | dovetail universal swivel friction holder (prior art) |
| 122 | end plug universal swivel friction holder (prior art) |
| 124 | double jointed end plug holder (prior art) |
| 126 | single jointed dovetail holder (prior art) |

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A dovetail accessory for a dial test indicator having a body with a dovetail tongue, said accessory comprising a dovetail hinge member to attach in an adjustable manner the dial test indicator to a dovetail extension in a spindle of a piece of industrial machinery, so that the dial test indicator can be properly aligned and positioned to measure various objects on the piece of industrial machinery, said dovetail hinge member comprising:

a) a first arm rectangular in cross section having on a top surface a dovetail groove to engage with the dovetail tongue on the body of the dial test indicator;

b) a first set screw extending through a side opposite the top surface in said first arm, to retain in place the dovetail tongue on the body of the dial test indicator within said dovetail groove;

c) a second arm rectangular in cross section having on a top surface a dovetail tongue to engage with the dovetail extension;

d) a second set screw extending through a side opposite the top surface in said second arm to retain in place the dovetail tongue on the top surface of said second arm; and e) a locking pivot assembly between said first arm and said second arm so that when said arms are aligned the top surfaces of said first and second arms are aligned, each of said first and second arms having an L-shaped cutout to permit said arms to have overlapping engagement with a pivot screw member extending through the L-shaped cutouts, said first and second arms being aligned on all sides.

* * * * *